United States Patent [19]

Tano et al.

[11] Patent Number: 4,507,223

[45] Date of Patent: Mar. 26, 1985

[54] HIGH CONCENTRATION SURFACTANT SLURRY

[75] Inventors: Tetsuo Tano, Chiba; Akira Hayashi, Yachiyo, both of Japan

[73] Assignee: Lion Corporation, Tokyo, Japan

[21] Appl. No.: 516,369

[22] Filed: Jul. 22, 1983

[30] Foreign Application Priority Data

Aug. 10, 1982 [JP] Japan ................................ 57-138958

[51] Int. Cl.$^3$ ........................ B01F 17/02; C09K 3/00; C11D 1/14; E21B 43/20
[52] U.S. Cl. ................................ 252/353; 252/8.55 D; 252/555; 252/DIG. 14
[58] Field of Search .................. 252/353, 8.55 D, 555, 252/DIG. 14

[56] References Cited

U.S. PATENT DOCUMENTS

| | | | |
|---|---|---|---|
| 2,318,036 | 5/1943 | Werntz | 252/353 X |
| 3,794,601 | 2/1974 | Kennedy | 252/353 X |
| 3,852,221 | 12/1974 | Bentley | 252/555 X |
| 3,865,735 | 2/1975 | Clark et al. | 252/8.55 D |
| 3,896,057 | 7/1975 | Lindsay et al. | 252/353 X |

*Primary Examiner*—Richard D. Lovering
*Attorney, Agent, or Firm*—Armstrong, Nikaido, Marmelstein & Kubovcik

[57] ABSTRACT

A high concentration slurry of olefin sulfonates containing at least 50% by weight of internal olefin sulfonates having a low viscosity is prepared by incorporating thereinto (i) at least one hydrocarbon selected from the group consisting of paraffins, olefins, and aromatic hydrocarbons having 6 to 24 carbon atoms and (ii) 1% to 40% by weight of water.

4 Claims, No Drawings

HIGH CONCENTRATION SURFACTANT SLURRY

BACKGROUND OF THE INVENTION

1. Field of the Invention

The present invention relates to a high concentration surfactant slurry containing a large amount of an internal olefin sulfonate. More specifically, it relates to a high concentration surfactant slurry containing 55% to 75% by weight of olefin sulfonates containing at least 50% by weight of internal olefin sulfonates and having a low viscosity.

2. Description of the Prior Art

Internal olefin sulfonates are surfactants having excellent wetting power and low-temperature stability (or solubility) and suitable for use as detergents and surfactants for enhanced oil recovery (EOR) methods. Internal olefin sulfonates are advantageously used in the form of a high concentration slurry, as in alkylbenzene sulfonates and other surfactants, from the standpoint of efficiency of the storage vessels or containers and the economics of transportation. However, a high concentration slurry containing 50% by weight or more of surfactant generally has a problem in that the viscosity of the slurry is undesirably increased to cause troubles in handling. Various techniques have been developed to produce low viscosity, high concentration slurries containing alkylbenzene sulfonates, alpha-olefin sulfonates (AOS), and polyoxyethylene alkylether sulfates. For example, the addition of inorganic halogen salts such as sodium chloride (U.S. Pat. No. 3,954,679), the addition of polyethyleneglycol (Japanese Unexamined Patent Application No. 50-116383), and the addition of an excess amount of alkali and alkylene oxide (Japanese Examined Patent Application No. 55-16504) have been proposed.

However, the viscosity of a high concentration slurry of internal olefin sulfonates cannot be effectively reduced by the use of the above-mentioned viscosity reducing techniques although these can reduce the viscosity of a high concentration slurry of alpha-olefin sulfonates having structures similar to those of the internal olefin sulfonates. This is because the viscosity behavior of the slurry containing a high concentration of internal olefin sulfonates differs considerably from that of slurries containing a high concentration of alpha-olefin sulfonates andd alkylbenzene sulfonates.

SUMMARY OF THE INVENTION

Accordingly, the object of the present invention is to provide a low viscosity slurry containing a high concentration of an internal olefin sulfonate or a high concentration of an olefin sulfonate containing at least 50% by weight of an internal olefin sulfonate.

Other objects and advantages of the present invention will be apparent from the following description.

In accordance with the present invention, there is provided a high concentration surfactant slurry comprising (i) 55% to 75% by weight of olefin sulfonates containing at least 50% by weight of internal olefin sulfonates, (ii) 5% to 40% by weight of at least one hydrocarbon selected from the group consisting of paraffins, olefins, and aromatic hydrocarbons having 6 to 24 carbon atoms, and (iii) 1% to 40% by weight of water.

DESCRIPTION OF THE PREFERRED EMBODIMENTS

The olefin sulfonates containing at least 50% by weight, desirably at least 80% by weight of an internal olefin sulfonate contained in the high concentration slurry according to the present invention are prepared by using, as a starting material, internal olefins or mixtures of internal olefins and alpha-olefins. The internal olefins and the mixtures thereof with alpha-olefins are readily prepared, for example, by the dehydrogenation of n-paraffins, the chlorination of n-paraffins and the subsequent dechlorination, or the polymerization of ethylene and the subsequent isomerization and disproportionation reaction.

Olefins having 10 to 30 carbon atoms are generally used as the starting material in the production of the olefin sulfonates. The desirable internal olefins are those having the general formula (I):

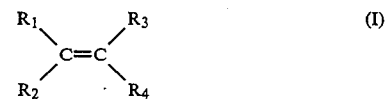

wherein $R_1$ is a linear or branched alkyl group desirably having 1 to 25 carbon atoms, $R_2$, $R_3$, and $R_4$ are independently hydrogen, or linear or branched alkyl group desirably having 1 to 25 carbon atoms, provided that $R_2$, $R_3$, and $R_4$ are not all hydrogen, and the total carbon number of $R_1$, $R_2$, $R_3$, and $R_4$ is 8 to 28, desirably 12 to 24. The alpha-olefins should desirably have 14 to 26 carbon atoms. Typical internal olefins having 14 to 18 carbon atoms represented by the general formula (I) have the double-bond distribution shown in Table 1.

TABLE 1

| Position of double bond | Content (mole %) |
| --- | --- |
| $\Delta^1$ (alpha-olefin) | 0 |
| $\Delta^2$ (n-olefin) | 10–30 |
| $\Delta^3$ (n-olefin) | 10–30 |
| $\Delta^4$ (n-olefin) | 10–30 |
| $\Delta^5$ (n-olefin) | 5–20 |
| $\Delta^6$ (n-olefin) | 5–15 |
| $\Delta^7$ (n-olefin) | 0–15 |
| $\Delta^8$ (n-olefin) | 0–15 |
| $\Delta^9$ (n-olefin) | 0–15 |

In addition to the olefins shown in Table 1, olefins having alkyl groups with branched chains, trisubstituted olefins (i.e., those having alkyl groups at $R_1$, $R_2$, and $R_3$ and hydrogen at $R_4$), and vinylidene type olefins (i.e., those having alkyl groups at $R_1$ and $R_2$ and hydrogen at $R_3$ and $R_4$) can also be used as a starting material in the production of the olefin sulfonates.

These starting olefins are sulfonated by, for example, $SO_3$ gas using any conventional method such as a batchwise method or a thin-film type method, then neutralized and hydrolyzed with an alkaline agent to produce the desired olefin sulfonates. The olefin sulfonates thus produced are mixtures of 10% to 50% by weight of alkene sulfonates, 90% to 50% by weight of hydroxyalkane sulfonates, and 0% to 25% by weight of disulfonates. When a mixture of an internal olefin and an alpha-olefin is used as the starting material, the content of the alpha-olefin in the mixture must be 50% by weight or less since the reactivity of the alpha-olefin with $SO_3$ is higher than that of the internal olefin. For example, the content of the alpha-olefin in the mixture is desirably 20% by weight or less in the case of a mole ratio of the starting material/SO$_3$ of 0.8 to 1.0 and the content of the alpha-olefin is desirably 30% or less in the case of a mole ratio of the starting material/SO$_3$ of more than 1.0.

According to the present invention, it is important that the content of alpha-olefin sulfonate be less than 50% by weight since the viscosity behaviors of the internal olefin sulfonate and the alpha-olefin sulfonate are remarkably different. That is, when the content of the alpha-olefin sulfonate is more than 50% by weight, the desired viscosity reducing effect cannot be obtained.

The hydrocarbons usable in the present invention are paraffins, olefins, or aromatic hydrocarbons having 6 to 24 carbon atoms, desirably 10 to 20 carbon atoms. These hydrocarbons can be used alone or in any mixture thereof. Typical examples of these hydrocarbons are octane, decane, tetradecane, octadecane, eicosane, docosane, decene, dodecene, tetradecene, hexadecene, octadecene, eicosene, benzene, xylene, butylbenzene, nonylbenzene, dodecylbenzene, or any mixture thereof. Especially, alkylbenzene and dialkylbenzene are desirably used as the aromatic hydrocarbon. Furthermore, the unreacted starting material in the production of the above-mentioned olefin sulfonate may also be used as the olefin.

The high concentration surfactant according to the present invention must contain water in addition to the above-mentioned olefin sulfonates and the specified hydrocarbons. That is, the increase in the viscosity caused by the inclusion of the olefin sulfonates at a high concentration can be effectively reduced by the synergetic effects of combining the above-mentioned hydrocarbons and water.

The content of the above-mentioned olefin sulfonates in the slurry according to the present invention must be 55% to 75% by weight, desirably 58% to 72% by weight. A content of these olefin sulfonates of from 45% by weight to, but not including, 55% by weight, or of more than 75% by weight causes undesirable gelation, which rapidly increases the viscosity. This abnormal increase in the viscosity of the slurry cannot be reduced even when the above-mentioned hydrocarbons and water are used.

The content of the above-mentioned hydrocarbons in the slurry according to the present invention must be 5% to 40% by weight, desirably 10% to 25% by weight. A content of the hydrocarbons of less than 5% by weight results in no substantial reduction in the viscosity of the slurry, whereas a content of the hydrocarbons of more than 40% by weight causes gelation due to an increase in the relative content of the olefin sulfonates in the slurry.

The content of water in the slurry according to the present invention must be 1% to 40% by weight, desirably 3% to 30% by weight. A content of the water of less than 1% by weight results in no substantial decrease in the viscosity of the slurry, whereas the content of the water of more than 40% by weight causes the undesirable gelation as mentioned above.

In the especially advantageous practice of the present invention, the olefins are partially sulfonated in the olefin sulfonation step, and the unreacted olefins are used as the hydrocarbon in the slurry according to the present invention. The sulfonated products containing the unreacted olefins are then neutralized and hydrolyzed by the addition of an aqueous high concentration alkaline solution containing 30% by weight or more of an alkaline agent such as sodium hydroxide and potassium hydroxide to produce the desired high concentration surfactant slurry containing 55% to 75% by weight of olefin sulfonates. This method is especially economical since the pumping load can be reduced during the production process because of the formation of the desired slurry having a high concentration but the low viscosity at the production step. This production process can be readily carried out, for example, under the following conditions:

| A. | Sulfonation | |
|---|---|---|
| | Reaction method: | thin-film type continuous sulfonation |
| | SO$_3$: | a mixture of SO$_3$ gas and an inert gas in a volume percent ratio of SO$_3$/inert gas of 1 to 10, desirably 1 to 5 |
| | SO$_3$/starting material (mole ratio): | 0.8 to 1.0 |
| | Reaction temp.: | 30° C. to 80° C. |
| B. | Neutralization | |
| | Alkaline agent: | 30% to 45% by weight aqueous NaOH solution |
| | Temperature: | 40° C. to 80° C. |
| | High speed agitation in batchwise or continuous operation | |
| C. | Hydrolysis | |
| | Temperature: | 100° C. to 180° C. |
| | Time: | 5 min to 7 hours |
| | pH after hydrolysis: | 7 to 14 |

The use of a low mole ratio of SO$_3$ to the starting material reduces polymerization reactions between the unreacted oil and the formation of carbylsulfate and, therefore, the content of undesirable impurities is decreased. This is also desirable from the viewpoints of the characteristics of the surfactant slurry. Furthermore, alkali hydroxides such as LiOH, KOH, and Mg(OH)$_2$, NH$_4$OH, and alkanol amines can be used in the above-mentioned neutralization step, in lieu of NaOH.

The surfactant slurry according to the present invention can also be produced by adding at least one hydrocarbon selected from the group consisting of the above-mentioned paraffins, olefins and, aromatic hydrocarbons having 6 to 24 carbon atoms to the slurry obtained from the use of a high SO$_3$ to the starting material mole ratio of 1.2 to 1.8 to reduce the formation of the unreacted oil as much as possible or to a concentrated slurry by vaporization or extraction.

The surfactant slurry according to the present invention may further contain a small amount of an alkaline metal sulfate formed during the neutralization of the olefin sulfonates such as sodium sulfate, potassium sulfate, lithium sulfate, magnesium sulfate, and ammonium sulfate, in addition to the above-mentioned components.

The surfactant slurry according to the present invention has a low viscosity although 55% to 75% by weight of olefin sulfonates is contained therein. Accordingly, the surfactant slurry is very advantageous from the practical viewpoint due to its easy handling property during transportation. In addition, when the surfactant slurry according to the present invention is used in the enhanced oil recovery method, the surfactant slurry can be used directly since the oil recovery efficiency is not adversely affected by the hydrocarbons present in the surfactant slurry. Moreover, the hydrocarbons can be readily removed from the surfactant slurry according to the present invention by, for example, vaporization. Thus, the present surfactant slurry can be used as detergents. In this case, the content of impurities such as carbylsulfate can be advantageously reduced.

EXAMPLE

The present invention will now be further illustrated by, but is by no means limited to, the following examples, in which all percentages are expressed on a weight basis unless otherwise specified.

EXAMPLE 1

Internal olefins (composition: $C_{14}$ 17%, $C_{16}$ 60%, and $C_{18}$ 23%; position of double bond: 2-position 15%, 3-position 13.5%, 4-position 16%, 5-position 15%, and 6 to 9-positions 40.5%) obtained from the polymerization of ethylene, followed by isomerization and disproportionation reactions, were used as the starting material. The internal olefins were sulfonated using a laboratory-scale continuous thin-film type sulfonation reactor. This sulfonation reactor was made of Pyrex glass. The inner diameter of the reactor was 6 mm and the reactor length was 120 cm. Parallel streams of the starting material and a $SO_3$-inert gas mixture were made to flow downward into the sulfonation reactor and reacted. The reaction conditions were as follows:

| | |
|---|---|
| $SO_3$/starting olefin (mole ratio) | 0.8 |
| $SO_3$/inert gas ($N_2$) | 2.8% by volume in the gas |
| Starting olefin feed rate | 6 ml/min |
| Starting olefin feed temp. | 25° C. |

The sulfonated product thus obtained was neutralized by the addition of a 35% aqueous sodium hydroxide solution at least in an equimolecular amount to the sulfonated product. After the neutralization, the reaction mixture was hydrolyzed at a temperature of 160° C. for 20 minutes to prepare sulfonate composition No. 1. The sulfonate composition No. 1 contained 64% of the sulfonate, 15% of the unreacted component, 17.5% of water, and 3.5% $Na_2SO_4$. The internal olefin was contained as the hydrocarbon in the unreacted component.

The oil components and water were removed from the sulfonate composition No. 1 to obtain sulfonate composition No. 2 containing 90% of the sulfonate, 2% of the unreacted component, 3% of water, and 5% of $Na_2SO_4$. Sulfonate compositions Nos. 3 and 4 containing 64% of the sulfonate and 15% of NaCl or polyethylene glycol were prepared by adding thereto NaCl and polyethylene glycol having an average molecular weight of 1000, respectively, and water to the sulfonate composition No. 2. Furthermore, sulfonate composition No. 5 containing 70% of the sulfonate was prepared by the addition of just water to the sulfonation composition No. 2.

The viscosity data for these compositions are shown in Table 2.

TABLE 2

| | | Composition No. | | | |
|---|---|---|---|---|---|
| | | 1 | | 4 | |
| Viscosity reducing agent | | $C_{14-18}$ internal olefin | 3 NaCl | Poly-ethylene-glycol | 5 None |
| Viscosity*[1] (poise) | 50° C. | 60 | 2000 or more | 240 | 350 |
| | 75° C. | 40 | 600 | 160 | 220 |

*[1]Viscosity was measured at 20 rpm by using a B-type viscometer (Rotor No. 4 to 7, Vismetron manufactured by Seiki Kogyo Kenkyusho) (the same method was used in the examples hereinbelow.)

As is clear from the results shown in Table 2, the sulfonate composition No. 1 having an extremely low viscosity can be obtained according to the present invention. Furthermore, this is also economically advantageous since the unreacted reactant can be used as a viscosity reducing agent in the present invention under the specified production conditions.

EXAMPLE 2

A 100% internal olefin sulfonate product was prepared from the sulfonate composition No. 2 prepared in Example 1 by removing the unreacted oil, water, and salt therefrom. Various sulfonate compositions Nos. 6 to 12 were prepared by adding the same internal olefin as in Example 1 and/or water to the 100% internal olefin sulfonate product.

The viscosity data for these compositions are shown in Table 3.

TABLE 3

| Composition No. | 6 | 7 | 8*[1] | 9*[1] | 10*[1] | 11 | 12 |
|---|---|---|---|---|---|---|---|
| Internal olefin sulfonate (%) | 67 | 55 | 55 | 67 | 70 | 50 | 80 |
| Internal olefin (%) | 33 | 45 | 40 | 18 | 20 | 40 | 15 |
| Water (%) | 0 | 0 | 5 | 15 | 10 | 10 | 5 |
| Viscosity 75° C. (poise) | 520 | 270 | 3 | 60 | 9 | 210 | 320 |

*[1]Present Invention

As is clear from the results shown in Table 3, the viscosity of the high concentration slurry on the internal olefin sulfonate is synergetically reduced by the use of the hydrocarbon and water. The viscosities of these slurries are less than 100 poises and, therefore, the handling in the transportation becomes easy. This is extremely desirable from the economical viewpoint.

EXAMPLE 3

Various olefin sulfonates in which the content ratios of an internal olefin sulfonate and an alpha-olefin sulfonate were changed were prepared by adding hydrocarbons and water to evaluate the characteristics thereof.

The sulfonate composition No. 2 prepared in Example 1 was used as the internal olefin sulfonate.

As the alpha-olefin sulfonate, an alpha-sulfonate composition No. 13 containing 95% of alpha-olefin sulfonate, 1% of the unreacted component, 2% of water, and 2% of $Na_2SO_4$ was prepared under the following conditions:

| | |
|---|---|
| Starting material: | Linear alpha-olefins having 14 carbon atom and containing 1% of paraffin components |
| $SO_3$/starting material (mole ratio) | 1.04 |

The other conditions were the same as in Example 1 and, after hydrolysis, the product was concentrated by using a rotary evaporator.

Composition Nos. 14 to 19 containing 60% of the sulfonate and 15% of the hydrocarbon both listed in Table 4 were prepared by changing the mixing ratio of the internal olefin sulfonate and the sulfonate composition No. 13 and also by adding hydrocarbons and water thereto.

The viscosities of these compositions are shown in Table 4.

TABLE 4

| Composition No. | 14 | 15 | 16 | 17 | 18 | 19 |
|---|---|---|---|---|---|---|
| IOS*1/AOS*2 (wt. ratio) | 0/100 | 0/100 | 45/55 | 60/40 | 80/20 | 100/0 |
| Hydrocarbon | $C_{14}$α-olefin | ← $C_{14}$ Internal olefin → | | | | |
| Viscosity 50° C. (poise) | 2000 | 2000 | 700 | 60 | 54 | 48 |
| 75° C. | 1000 | 1000 | 500 | 40 | 33 | 25 |

*1 Abbreviation of internal olefin sulfonate
*2 Abbreviation of alpha-olefin sulfonate As is clear from the results shown in Table 4, it was not possible to reduce the viscosities of composition Nos. 14 to 16 having a large content of the alpha-olefin sulfonate by the addition of the hydrocarbons and water. Contrary to this, the viscosities of composition Nos. 17 to 19 according to the present invention containing 50% or more of the internal olefin sulfonates were remarkably reduced by the addition of the hydrocarbon and water.

EXAMPLE 4

Various sulfonation products listed in Table 5 were prepared from various starting materials by using the sulfonation reactor used in Example 1.

TABLE 5

| | Olefin sulfonate | | | | Other components | | |
|---|---|---|---|---|---|---|---|
| No. | C number | Type of olefin | Type of salt | Content (%) | Unreacted component (%) | Water (%) | Inorganic salt (%) |
| A*1 | 13/14 (55%/45%) | Internal olefin | Mg | 95 | 1 | 2 | 2 |
| B*1 | 14 | " | K | 95 | 1 | 2 | 2 |
| C*1 | 20-24 | " | Na | 90 | 2 | 3 | 5 |
| D*1 | 16 | Vinylidene type | Na | 95 | 1 | 2 | 2 |
| E | 20 | 85% Trisubstituted internal olefin and the remaining internal olefin | Na | 55 | 30 | 10 | 5 |
| F*2 | 14-18 | Internal olefin/alpha-olefin = 65/35 | Na | 60 | 25 | 11 | 4 |
| G*3 | 16 | Internal olefin | Na | 58 | 22 | 17 | 3 |

*1 Prepared by the neutralization, hydrolysis, oil removal and concentration as in Example 1.
*2 Prepared from a starting olefin mixture of internal olefin/alpha-olefin = 80/20 under the reaction condition of the starting material/$SO_3$ mole ratio of 0.9.
*3 Prepared from the starting olefin mixture of internal olefin/paraffin = 70/30 under the reaction condition of the starting material/$SO_3$ mole ratio of 0.7.

To the olefin sulfonates A to G, various hydrocarbons and water were added to determine the viscosities of the resultant compositions.

The results are shown in Table 6.

TABLE 6

| Composition No. | | 20 | 21 | 22 | 23 | 24 | 25* | 26* | 27* |
|---|---|---|---|---|---|---|---|---|---|
| Olefin sulfonate | Kind | A | A | B | C | D | E | F | G |
| | % | 60 | 60 | 70 | 55 | 60 | 55 | 60 | 58 |
| Hydrocarbon | Kind | Tetradecane | Xylene | $C_{18}$ alkylbenzene | $C_{12}$ internal olefin | $C_{14}$ internal olefin | Tri-substituted type olefin and internal olefin | Alpha-olefin and internal olefin | Paraffin and internal olefin |
| | % | 20 | 18 | 20 | 20 | 25 | 30 | 25 | 22 |
| Water % | | 18.1 | 20.1 | 7.8 | 20.7 | 13.1 | 10 | 11 | 17 |
| Viscosity (poise) | 75° C. | 40 | 10 | 35 | 25 | 50 | 5 | 15 | 20 |
| | 50° C. | 60 | 35 | 60 | 50 | 80 | 10 | 35 | 45 |

*Unreacted components and water were used as the viscosity reducing agent.

We claim:
1. A high concentration surfactant slurry comprising (i) 55% to 75% by weight of olefin sulfonates containing at least 50% by weight of internal olefin sulfonates, (ii) 5% to 40% by weight of at least one hydrocarbon selected from the group consisting of paraffins, olefins, and aromatic hydrocarbons having 6 to 24 carbon atoms, and (iii) 1% to 40% by weight of water.

2. A slurry as claimed in claim 1, wherein the internal olefin sulfonates are prepared by sulfonating internal olefins having the general formula (I)

wherein $R_1$ is a linear or branched alkyl group, $R_2$, $R_3$, and $R_4$ are independently hydrogen, or linear or branched alkyl groups, provided that $R_2$, $R_3$, and $R_4$ are not all hydrogen, and the total carbon number of $R_1$, $R_2$, $R_3$, and $R_4$ is 8 to 28, followed by neutralization and subsequent hydrolysis.

3. A method for preparing a high concentration surfactant slurry comprising 55% to 75% by weight of olefin sulfonates containing at least 50% by weight of internal olefin sulfonates characterized by incorporating (i) 5% to 40% by weight of at least one hydrocarbon selected from the group consisting of paraffins, olefins, and aromatic hydrocarbons having 6 to 24 carbon atoms and (ii) 1% to 40% by weight of water in order to reduce the viscosity of the high concentration slurry.

4. A method as claimed in claim 3, wherein the internal olefin sulfonates are prepared by sulfonating internal olefins having the general formula (I)

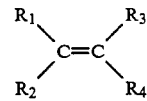

wherein $R_1$ is a linear or branched alkyl group, $R_2$, $R_3$ and $R_4$ are independently hydrogen, or linear or branched alkyl groups, provided that $R_2$, $R_3$, and $R_4$ are not all hydrogen, and the total carbon number of $R_1$, $R_2$, $R_3$, and $R_4$ is 8 to 28, followed by neutralization and subsequent hydrolysis.

* * * * *